US012408685B2

(12) United States Patent
Erickson et al.

(10) Patent No.: US 12,408,685 B2
(45) Date of Patent: Sep. 9, 2025

(54) ANIMAL FEED FOR IMPROVING THE GROWTH PERFORMANCE

(71) Applicants: EVONIK OPERATIONS GMBH, Essen (DE); BOARD OF REGENTS OF THE UNIVERSITY OF NEBRASKA, Lincoln, NE (US); DSM IP ASSETS B.V., TE Heerlen (NL)

(72) Inventors: Galen Erickson, Lincoln, NE (US); Mitch Norman, Ashland, NE (US); Christian Rabe, Grossostheim (DE); Andrea Watson, Ceresco, NE (US); Jonathan Wesley Wilson, Blacksburg, VA (US)

(73) Assignees: Evonik Operations GmbH, Essen (DE); Bord of Regents of the University of Nebraska, Lincoln, NE (US); DSM IP Assets B.V., Heerlen (NL)

( * ) Notice: Subject to any disclaimer, the term of this patent is extended or adjusted under 35 U.S.C. 154(b) by 957 days.

(21) Appl. No.: 17/284,463

(22) PCT Filed: Oct. 8, 2019

(86) PCT No.: PCT/EP2019/077183
§ 371 (c)(1),
(2) Date: Apr. 10, 2021

(87) PCT Pub. No.: WO2020/074488
PCT Pub. Date: Apr. 16, 2020

(65) Prior Publication Data
US 2021/0386095 A1     Dec. 16, 2021

Related U.S. Application Data

(60) Provisional application No. 62/744,679, filed on Oct. 12, 2018.

(30) Foreign Application Priority Data

Dec. 11, 2018 (EP) .................................. 18211574

(51) Int. Cl.
| | |
|---|---|
| A23K 10/38 | (2016.01) |
| A23K 10/18 | (2016.01) |
| A23K 20/147 | (2016.01) |
| A23K 20/158 | (2016.01) |
| A23K 20/174 | (2016.01) |
| A23K 20/20 | (2016.01) |
| A23K 50/10 | (2016.01) |

(52) U.S. Cl.
CPC .............. *A23K 10/38* (2016.05); *A23K 10/18* (2016.05); *A23K 20/147* (2016.05); *A23K 20/158* (2016.05); *A23K 20/174* (2016.05); *A23K 20/20* (2016.05); *A23K 50/10* (2016.05)

(58) Field of Classification Search
CPC .... A23K 10/38; A23K 20/147; A23K 20/158; A23K 20/20; A23K 20/174; A23K 50/10; A23K 10/18
See application file for complete search history.

(56) References Cited

U.S. PATENT DOCUMENTS

| | | |
|---|---|---|
| 8,747,916 B1 | 6/2014 | Smith et al. |
| 8,993,099 B2 | 3/2015 | Smith |
| 10,531,679 B2 | 1/2020 | Rudinger et al. |
| 10,619,175 B2 | 4/2020 | Rabe et al. |
| 10,842,174 B2 | 11/2020 | Durhuus et al. |
| 2003/0211221 A1 | 11/2003 | Abril et al. |
| 2015/0201649 A1 | 7/2015 | Lei |
| 2015/0320086 A1* | 11/2015 | Piechocki ............. A23K 50/30 426/656 |
| 2016/0249642 A1 | 9/2016 | Rabe et al. |
| 2017/0119018 A1 | 5/2017 | Lei |
| 2017/0290356 A1 | 10/2017 | Silva et al. |
| 2017/0295823 A1 | 10/2017 | Rabe et al. |
| 2017/0295824 A1 | 10/2017 | Priefert et al. |
| 2017/0298318 A1 | 10/2017 | Rabe et al. |
| 2017/0354166 A1 | 12/2017 | Smith et al. |
| 2017/0354168 A1 | 12/2017 | Smith et al. |
| 2018/0208886 A1 | 7/2018 | Cagnac et al. |
| 2019/0249108 A1 | 8/2019 | Cherinko et al. |
| 2019/0300818 A1 | 10/2019 | Barz et al. |
| 2019/0323043 A1 | 10/2019 | Diehl et al. |
| 2020/0015500 A1 | 1/2020 | De Vriendt |

(Continued)

FOREIGN PATENT DOCUMENTS

| | | | | |
|---|---|---|---|---|
| BR | 112021004137 A2 * | 5/2021 | ................ | A23J 1/14 |
| CN | 106551162 | 4/2017 | | |

(Continued)

OTHER PUBLICATIONS

Gatrell et al., "Developing Omega-3 Fatty Acids-Enriched Products by Feeding Defatted Microalgal Biomass From Biofuel Production". Cornell Nutrition Conference for Feed Manufacturers (2014)) (Year: 2014).*

(Continued)

*Primary Examiner* — Erik Kashnikow
*Assistant Examiner* — Assaf Zilbering
(74) *Attorney, Agent, or Firm* — Law Office of Michael A. Sanzo, LLC

(57) ABSTRACT

Condensed algal residue solubles turned out to be a beneficial feed ingredient for feeding animals, in particular for improving the growth performance of beef cattle.

19 Claims, No Drawings

(56) References Cited

U.S. PATENT DOCUMENTS

| | | | |
|---|---|---|---|
| 2020/0231896 | A1 | 7/2020 | Bahl et al. |
| 2020/0231898 | A1 | 7/2020 | Barz et al. |
| 2020/0339498 | A1 | 10/2020 | Heining et al. |
| 2020/0362373 | A1 | 11/2020 | Leininger et al. |
| 2020/0383353 | A1 | 12/2020 | Wilson et al. |
| 2020/0404938 | A1 | 12/2020 | Heining et al. |
| 2021/0017467 | A1 | 1/2021 | Adugna et al. |
| 2021/0024966 | A1 | 1/2021 | Heining et al. |
| 2021/0163842 | A1 | 6/2021 | Heining et al. |
| 2021/0171991 | A1 | 6/2021 | Burja et al. |
| 2022/0017929 | A1 | 1/2022 | Priefert et al. |
| 2022/0017930 | A1 | 1/2022 | Priefert et al. |
| 2023/0242836 | A1 | 8/2023 | Diehl et al. |

FOREIGN PATENT DOCUMENTS

| | | |
|---|---|---|
| GB | 2 437 909 | 11/2007 |
| WO | WO 02/00028 | 1/2002 |
| WO | WO 2014/122087 | 8/2014 |
| WO | WO 2014/122092 | 8/2014 |
| WO | WO 2015/171151 | 11/2015 |
| WO | WO 2018/011275 | 1/2018 |
| WO | WO 2018/011286 | 1/2018 |
| WO | WO 2019/122030 | 6/2019 |
| WO | WO 2020/123965 | 6/2020 |

OTHER PUBLICATIONS

Johnson et al., "Production of Biodiesel Fuel from the Microalga Schizochytrium limacinum by Direct Transesterification of Algal Biomass". Energy Fuels 2009, 23, 5179-5183). (Year: 2009).*

Trenkle "Relative Feeding Value of Wet Corn Steep Liquor When Fed to Finishing Cattle". 2002 Beef Research Report—Iowa State University. Available online at https://www.iastatedigitalpress.com/air/article/7435/galley/7264/view/ (Year: 2002).*

Reboleira et al., "Evaluating the Potential of the Defatted By-Product of Aurantiochytrium sp. Industrial Cultivation as a Functiona Food" s 2021, 10, 3058. (Year: 2021)*

U.S. Appl. No. 18/010,795, filed Dec. 15, 2022, US-2023/0242836 A1, Aug. 3, 2023, Diehl.

International Search Report for corresponding international application PCT/EP2019/077183 filed Oct. 8, 2019.

Written Opinion of the International Searching Authority for corresponding international application PCT/EP2019/077183 filed Oct. 8, 2019.

International Preliminary Report on Patentability for corresponding international application PCT/EP2019/077183 filed Oct. 8, 2019.

Ames, et al., "Carcinogens ar Mutagens: A Simple Test System Combining Liver Homogenates for Activation and Bactria for Detection," Proc. Nat. Acad. Sci. USA 70(8):2281-2285 (Aug. 1973).

Bryant, et al., "The value of post-extracted algae residue," Algal Research 1:185-193 (2012).

Costa, et al., "Supplementation of cattle fed tropical grasses with microalgae increases microbial protein production and average daily gain," J.Anim. Sci. 94(5):2047-2058 (May 2016).

Drewery, et al., "Effect of increasing amounts of post extraction algal residue on straw utilization in steers," J.Anim. Sci. 92(10):4642-4649 (Oct. 2014).

FASS 2010. Guide for the Care and Use of Agricultural Animals in Agricultural Research and Teaching. 3rd rev. ed. FASS Inc., Champaign, Ill.

Franklin, et al., "Dietary marine algae (Schizochytrium sp.) increases concentrations of conjugated linoleic, docosahexaenoic and transvaccenic acids in milk of dairy cows," J. Nutr. 129:2048-2052 (1999).

Hersom, et al., "Effect of live weight gain of steers during winter grazing: II. Visceral organ mass, celluarity, and oxygen consumption," J.Anim. Sci. 82(1): 184-197 (Jan. 2004).

Littell, et al., "Statistical analysis of repeated measures data using SAS procedures," J.Anim. Sci. 76(4):1216-1231 (Apr. 1998).

Lum, et al., "Dual potential of microalgae as a sustainable biofuel feedstock and animal feed," J.Anim. Sci.and Biotechnology 4:53-60 (2013).

McCurdy, et al., "Effects of winter growing program on visceral organ mass, composition, and oxygen consumption of beef steers during growing and finishing," J.Anim. Sci. 88(4):1554-1563 (Apr. 2010).

Ogbonna, et al., "An efficient method of producing Chlorella biomass for health food and animal feed," J. Applied Phycology 9:359-366 (1997).

Stamey, et al., "Use of algae of algal oil rich in n-3 fatty acids as a feed supplement for dairy cattle," J. Dairy Sci. 95(9):5269-5275 (Sep. 2012).

Stokes, et al., "Effects of increased inclusion of algae meal on finishing performance and carcass characteristics," J.Anim. Sci. 94(2):687-696 (Feb. 2016).

Van Emon, et al., "Determining the preference, in vitro digestibility, in situ disappearance, and grower period performance of steers fed a novel algae meal derived from heterotrophic microalgae," J.Anim. Sci.93(6):3121-3129 (Jun. 2015).

Vasconcelos, et al., "Technical Note: Do dietary net energy values calculated from performance data offer increased sensitivity for detecting treatment differences?" J.Anim. Sci.86(10):2756-2760 (Oct. 2008).

Veterinary Pathology, Reference intervals from Clinical Pathology Labroratory. Department of Veterinary Pathology, College of Veterinary Medicine, Iowa State, (2011). (https://www.vetmed.iastate.edu.vpath/services/diagnostic-services/clinical-pathology/testing-and-fees/reference-intervals.

Watson, et al., "Impacts of a limit-feeding procedure on variation and accuracy of cattle weights," J.Anim. Sci.91(11):5507-5517 (Nov. 2013).

U.S. Appl. No. 15/027,429, filed Apr. 5, 2016, US-2016/0249642 A1, Sep. 1, 2016, Rabe.

U.S. Appl. No. 15/516,022, filed Mar. 31, 2017, US-2017/0295823 A1, Oct. 19, 2017, Rabe.

U.S. Appl. No. 15/516,023, filed Mar. 31, 2017, US-2017/0290356 A1, Oct. 12, 2017, Silva.

U.S. Appl. No. 15/516,024, filed Mar. 31, 2017, US-2017/0295824 A1, Oct. 19, 2017, Priefert.

U.S. Appl. No. 15/516,038, filed Mar. 31, 2017, US-2017/0298318 A1, Oct. 19, 2017, Rabe.

U.S. Appl. No. 16/309,632, filed Dec. 13, 2018, US-2019/0249108 A1, Aug. 15, 2019, Cherinko.

U.S. Appl. No. 16/317,249, filed Jan. 11, 2019, US-2019/0300818 A1, Oct. 3, 2019, Bärz.

U.S. Appl. No. 16/317,305, filed Jan. 11, 2019, US-2020/0231898 A1, Jul. 23, 2020, Bärz.

U.S. Appl. No. 16/473,805, filed Jun. 26, 2019, US-2019/0323043 A1, Oct. 24, 2019, Diehl.

U.S. Appl. No. 16/639,529, filed Feb. 14, 2020, US-2021/0171991 A1, Jun. 10, 2021, Burja.

U.S. Appl. No. 16/644,443, filed Mar. 4, 2020, US-2020/0231896 A1, Jul. 23, 2020, Bahl.

U.S. Appl. No. 16/469,286, filed Jun. 13, 2019, US-2020/0015500, Jan. 16, 2020, De Vriendt.

U.S. Appl. No. 16/636,940, filed Feb. 6, 2020, US-2020/0362373 A1, Nov. 19, 2020, Leininger.

U.S. Appl. No. 16/886,691, filed May 28, 2020, US-2020/0383353 A1, Dec. 10, 2020, Wilson.

U.S. Appl. No. 16/956,453, filed Jun. 19, 2020, US-2020/0339498 A1, Oct. 29, 2020, Heining.

U.S. Appl. No. 16/956,820, filed Jun. 22, 2020, US-2020/0404938 A1, Dec. 31, 2020, Heining.

U.S. Appl. No. 17/042,788, filed Sep. 28, 2020, US-2021/0024966 A1, Jan. 28, 2021, Heining.

U.S. Appl. No. 17/042,791, filed Sep. 28, 2020, US-2021/0017467 A1, Jan. 21, 2021, Adugna.

U.S. Appl. No. 17/055,047, filed Nov. 12, 2020, Heining.

(56) References Cited

OTHER PUBLICATIONS

U.S. Appl. No. 17/055,083, filed Nov. 12, 2020, US-2021/0163842 A1, Jun. 3, 2021, Heining.
U.S. Appl. No. 17/291,608, filed May 6, 2021, Priefert.
U.S. Appl. No. 17/291,610, filed May 6, 2021, Priefert.

* cited by examiner

ANIMAL FEED FOR IMPROVING THE GROWTH PERFORMANCE

CROSS REFERENCE TO RELATED APPLICATIONS

The present application is US national stage of international application PCT/EP2019/077183, which had an international filing date of Oct. 8, 2019 and which claims the benefit of U.S. 62/744,679, filed on Oct. 12, 2018 and priority to EP 18211574.1, filed in Europe on Dec. 11, 2018. These prior applications are hereby incorporated by reference herein in their entirety.

This invention was made with government support under 2016-31100-06031 and NA/NI18HFPXXXXXG045 and NA/NI17HFPXXXXXG047 awarded by the United States Department of Agriculture. The government has certain rights in the invention.

Condensed algal residue solubles turned out to be a beneficial feed ingredient for feeding animals, in particular for improving the growth performance of beef cattle.

With increasing interest in production of algae derived omega-3 fatty acids for both human food and animal feeds, coproducts from the algae industry could result in an alternative feed ingredient for cattle. Algal biomass is a potential source of protein, fiber and fat, which could contribute essential nutrients in cattle diets. A condensed algal residue solubles (CARS; Veraferm, Veramaris, Delft, Netherlands), is being commercially produced from heterotrophic algae as a result of producing omega-3 fatty acids for use in the animal feed industry, primarily aquaculture and pet foods. The CARS is produced by condensing the residue from algal fermentation of dextrose after the oil has been extracted from the algal cells without organic solvents and has a syrupy consistency. The algal strain which was used for producing the CARS is a microalgal *Schizochytrium* strain belonging to the group of Stramenopiles. CARS is produced by concentrating the delipidated Schizochytrid biomass to a dry matter content of between 30 and 50 wt.-%, preferably about 40 wt.-%. CARS is therefore according to the invention also referred to as a delipidated Stramenopiles biomass suspension or delipidated Schizochytrid biomass suspension.

Marine algae, commonly photoautotrophic, have been utilized in animal diets for many years and utilize photosynthesis to harness simple inorganic substances as energy and nutrients (Lum et al., 2013). Heterotrophic algae, grown using complex organic substances for feedstuffs, may result in improved yields and growth efficiency, and thus improve the economics of utilizing algae as a livestock feedstuff (Ogbonna et al., 1997; Bryant et al., 2012). Van Emon et al. (2015), fed a heterotrophic microalgae meal (57% microalgae, 43% soyhulls) to growing cattle. They observed greater DMI, a tendency for ADG to increase, and decreased G:F as algae meal increased from 0 to 45% of diet DM, replacing wet corn gluten feed. A similar algae meal (43% partially deoiled heterotrophic microalgae and 57% soyhulls) was fed to finishing cattle (Stokes et al., 2016) replacing corn at 0 to 42% of diet DM. They reported no change in HCW and a linear decrease in calculated dietary NEg content as inclusion increased in the diet. These results suggest the algae product is a suitable cattle feed when mixed with soyhulls. Little research has been conducted on algae as a feed ingredient and no research has been conducted feeding CARS to cattle; therefore, the objectives of this study were to evaluate the safety of CARS as a feed ingredient in cattle diets and the performance response to increasing inclusion in the diet.

Surprisingly it has been found out according to the invention that a mixture of CARS with further feedstuff ingredients has significant positive effects on the performance of the beef cattle, in particular on the dry matter intake (DMI), average daily gain (ADG), gain feed ratio (G:F), net energy for maintenance (NEm) and net energy for growth (NEg).

Thus, a first subject matter of the current invention is an animal feed comprising
  a) 50 to 80 wt. % dry matter of cereal grains;
  b) 0.1 to 15 wt.-%, preferably 0.5 to 10 wt.-%, in particular 1 to 6 wt.-%, dry matter of a Stramenopiles biomass;
    at least one, preferably at least two, three or four, further components selected from
  c) by-products from distillers/ethanol industry in an amount of up to 40 wt.-% dry matter;
  d) forage in an amount of up to 20 wt.-% dry matter;
  e) protein meal in an amount of up to 20 wt.-% dry matter;
  f) a further fat source in an amount of up to 4 wt.-% dry matter;
  g) a further liquid by-product in an amount of up to 10 wt.-% dry matter.

The optimal amount of the different components can be calculated by using a computer program for determining the components and their optimal amount for realizing an optimized and preferably cheap feed diet for the animals to be fed with the feedstuff, wherein the resulting feed preferably meets or, more preferably, exceeds the nutrient requirements for the respective animal, as documented in the NRC tables, as well known to animal nutritionists.

The wt.-% numbers with respect to components of the animal feed, according to the invention always refer to the dry matter content of the animal feed, if not explicitly indicated otherwise.

In a preferred embodiment of the invention, in particular in a feed for feeding beef cattle, the animal feed exhibits a content of crude protein of more than 20 wt.-%, in particular 20 to 40 wt.-%, preferably 25 to 35 wt.-% dry matter and/or a content of neutral detergent fibers (NDF) of more than 25 wt.-%, in particular 25 to 45 wt.-%, preferably 30 to 40 wt.-% dry matter.

In the feedstuff according to the invention, the cereal grains are preferably selected from corn, barley, sorghum, wheat and mixtures thereof, with corn being preferred.

Further, the by-products from distillers/ethanol industry are preferably contained, if present, in an amount of 0.5 to 40 wt.-%, in particular 2 to 40 wt.-%, more preferably 5 to 30 wt.-%, in particular 10 to 25 wt.-% or 10 to 20 wt.-%, and are preferably selected from distillers corn, distillers barley, distillers sorghum, distillers wheat and mixtures thereof, with distillers corn being preferred.

Further, the forage is preferably contained, if present, in an amount of 0.1 to 20 wt.-%, more preferably 1 to 20 wt.-%, in particular 5 to 15 wt.-%, and is preferably selected from grass hay, alfalfa hay, grass silage, corn silage, rye silage and mixtures thereof.

In a preferred embodiment of the invention, a protein meal is comprised by the feedstuff, preferably in an amount of 0.5 to 20 wt.-%, in particular 2 to 20 wt.-%, wherein the protein meal is preferably selected from canola meal, soybean meal and mixtures thereof.

In a preferred embodiment of the invention, a further fat source is comprised by the feedstuff, preferably in an amount of 0.5 to 4 wt.-%, in particular 1 to 4 wt.-%, wherein the fat source is preferably selected from grease, poultry fat, vegetable oils like corn and canola oil, and mixtures thereof.

In a preferred embodiment of the invention, a further liquid by-product is comprised by the feedstuff, preferably in an amount of 0.5 to 10 wt.-%, in particular 1 to 10 wt.-%, wherein the further liquid by-product is preferably selected from molasses products, corn steep liquids, glycerol and mixtures thereof.

The animal feed preferably further comprises mineral and vitamin supplements, preferably in an amount of in total 0.05 to 2 wt.-% dry matter.

A particularly preferred embodiment of the current invention is an animal feed comprising
- a) 50 to 80 wt. % dry matter of cereal grains;
- b) 0.1 to 15 wt.-%, preferably 0.5 to 10 wt.-%, in particular 1 to 6 wt.-%, dry matter of a Stramenopiles biomass;
- c) by-products from distillers/ethanol industry in an amount of up to 40 wt.-% dry matter, preferably in an amount of 5 to 20 wt.-% dry matter, more preferably in an amount of 5 to 30 wt.-% dry matter;
- d) forage in an amount of up to 20 wt.-% dry matter, preferably in an amount of 5 to 15 wt.-% dry matter.

The Stramenopiles biomass according to the invention is preferably a lysed biomass or an aqueous suspension thereof, more preferably a delipidated biomass or an aqueous suspension thereof. A lysed Stramenopiles biomass or aqueous suspension thereof can be obtained by means as known to those skilled in the art, by applying mechanical stress to the cells and/or by enzymatic treatment. The delipidated biomass or aqueous suspension thereof can be obtained as disclosed for example in WO 2018/011275 and WO 2018/011286.

Accordingly, "delipidated biomass" refers to the residues of a Stramenopiles biomass, in particular as disclosed further below, after having been subjected to an oil isolation process, in particular as disclosed in WO 2018/011275 and WO 2018/011286.

A further particularly preferred subject matter of the current invention is therefore an animal feed comprising
- a) 50 to 80 wt. % dry matter of cereal grains;
- b) 0.1 to 15 wt.-%, preferably 0.5 to 10 wt.-%, in particular 1 to 6 wt.-%, dry matter of a delipidated Stramenopiles biomass or an aqueous suspension thereof;
- at least one, preferably at least two, three or four, further components selected from
- c) by-products from distillers/ethanol industry in an amount of up to 40 wt.-% dry matter;
- d) forage in an amount of up to 20 wt.-% dry matter;
- e) protein meal in an amount of up to 20 wt.-% dry matter;
- f) a further fat source in an amount of up to 4 wt.-% dry matter;
- g) a further liquid by-product in an amount of up to 10 wt.-% dry matter.

A further particularly preferred subject matter of the current invention is therefore also an animal feed comprising
- a) 50 to 80 wt. % dry matter of cereal grains;
- b) 0.1 to 15 wt.-%, preferably 0.5 to 10 wt.-%, in particular 1 to 6 wt.-%, dry matter of a delipidated Stramenopiles biomass or an aqueous suspension thereof;
- c) by-products from distillers/ethanol industry in an amount of up to 40 wt.-% dry matter, preferably in an amount of 5 to 20 wt.-% dry matter, more preferably in an amount of 5 to 30 wt.-% dry matter;
- d) forage in an amount of up to 20 wt.-% dry matter, preferably in an amount of 5 to 15 wt.-% dry matter.

The cells of the Stramenopiles biomass are according to the invention preferably selected from the following groups of microorganisms: Hamatores, Proteromonads, Opalines, Developayella, Diplophrys, Labrinthulids, Thraustochytrids, Biosecids, Oomycetes, Hypochytridiomycetes, Commation, Reticulosphaera, Pelagomonas, Pelagococcus, Ollicola, Aureococcus, Parmales, Diatoms, Xanthophytes, Phaeophytes (brown algae), Eustigmatophytes, Raphidophytes, Synurids, Axodines (including Rhizochromulinales, Pedinellales, Dictyochales), Chrysomeridales, Sarcinochrysidales, Hydrurales, Hibberdiales, and Chromulinales.

The biomass according to the invention, which is used in particular for providing the lysed and/or delipidated biomass, preferably comprises cells, and preferably consists essentially of such cells, of the taxon Labyrinthulomycetes (Labyrinthulea, net slime fungi, slime nets), in particular those from the family of Thraustochytriaceae. The family of the Thraustochytriaceae (Thraustochytrids) includes the genera *Althomia, Aplanochytrium, Aurantiochytrium, Botryochytrium, Elnia, Japonochytrium, Oblongichytrium, Parietichytrium, Schizochytrium, Sicyoidochytrium, Thraustochytrium, and Ulkenia*. The biomass particularly preferably comprises cells from the genera *Aurantiochytrium, Oblongichytrium, Schizochytrium, or Thraustochytrium*, above all from the genus *Schizochytrium*.

A further particularly preferred subject matter of the current invention is therefore an animal feed comprising
- a) 50 to 80 wt. % dry matter of cereal grains;
- b) 0.1 to 15 wt.-%, preferably 0.5 to 10 wt.-%, in particular 1 to 6 wt.-%, dry matter of a delipidated Schizochytrid or Thraustochytrid biomass or an aqueous suspension thereof;
- at least one, preferably at least two, three or four, further components selected from
- c) by-products from distillers/ethanol industry in an amount of up to 40 wt.-% dry matter;
- d) forage in an amount of up to 20 wt.-% dry matter;
- e) protein meal in an amount of up to 20 wt.-% dry matter;
- f) a further fat source in an amount of up to 4 wt.-% dry matter;
- g) a further liquid by-product in an amount of up to 10 wt.-% dry matter.

A further particularly preferred subject matter of the current invention is therefor also an animal feed comprising
- a) 50 to 80 wt. % dry matter of cereal grains;
- b) 0.1 to 15 wt.-%, preferably 0.5 to 10 wt.-%, in particular 1 to 6 wt.-%, dry matter of a delipidated Schizochytrid or Thraustochytrid biomass or an aqueous suspension thereof;
- c) by-products from distillers/ethanol industry in an amount of up to 40 wt.-% dry matter, preferably in an amount of 5 to 20 wt.-% dry matter, more preferably in an amount of 5 to 30 wt.-% dry matter;
- d) forage in an amount of up to 20 wt.-% dry matter, preferably in an amount of 5 to 15 wt.-% dry matter.

The biomass according to the invention is preferably a delipidated biomass or an aqueous suspension thereof. A delipidated biomass is a biomass, of which the major part of the lipids have been removed, preferably by a process as disclosed in WO 2018/011275 or WO 2018/011286. As the separation of oil from the biomass is very effectively, the remaining oil in the biomass is preferably less than 20 wt.-%, preferably less than 15 wt.-%, more preferably less than 10 wt.-%, of the oil as originally contained in the biomass. But as the oil cannot be removed completely by such a process, a substantial amount of oil is still contained also in the delipidated biomass according to the invention. That means that the term "delipidated biomass" according to the invention refers to a lysed biomass, from which the major part of oil has been removed, preferably by a process or method as disclosed in WO 2018/011275, but which still contains a substantial part of lipids, in particular of PUFAs containing lipids. Thus, the "delipidated biomass" according to the invention might also be called a "partially delipidated biomass" or a "substantially delipidated biomass".

The biomass according to the invention is preferably substantially free of non-polar organic solvents, more preferably free of organic solvents, in general, and contains preferably only a small amount of sodium chloride, preferably a small amount of chloride salts, in general. It preferably contains non-polar organic solvents, in particular organic solvents in general, if present at all, in an amount of less than 0.2 wt.-%, more preferably in an amount of less than 0.1 wt.-%.

The delipidated Stramenopiles biomass according to the invention can be used as feed ingredient in different application forms, in particular as dried biomass or as aqueous suspension. "Dried biomass" according to the invention refers to a biomass with a dry matter content of at least 90 wt.-%, preferably at least 95 wt.-%.

If a dried Stramenopiles biomass is used as feed ingredient, then the dried biomass preferably comprises lipids (crude fat) in an amount of about 3 to 14 wt.-%), in particular about 4 to about 14 wt.-%, preferably in an amount of about 4.5 to about 12 wt.-%, more preferably in an amount of about 5 to about 10 wt.-%. Further, the lipid preferably comprises at least one PUFA selected from DHA and EPA, preferably in an amount of from 10 to 70 wt.-%, more preferably in an amount of 30 to 60 wt.-%. In a preferred embodiment of the invention, the lipid contains a mixture of DHA and EPA, wherein the ratio of DHA to EPA is preferably between 3:2 to 4:1 and wherein the amount of DHA is preferably from 30 to 50 wt.-% of the total amount of lipids contained and the amount of EPA is preferably from 10 to 20 wt.-%. of the total amount of lipids contained.

The dried biomass preferably further comprises amino acids in an amount of 15 to 25 wt.-%, more preferably in an amount of 17 to 23 wt.-%, and exhibits preferably a crude protein content of 25 to 35 wt.-%. The biomass preferably further exhibits a crude fiber content of less than 5 wt.-%, preferably less than 2 wt.-%, more preferably of about 0 wt.-%.

In a preferred embodiment of the invention, an aqueous suspension of a delipidated Stramenopiles biomass, in particular delipidated Schizochytrid or Thraustochytrid biomass, is used as feed supplement, wherein the aqueous suspension has preferably a dry matter content of between 20 and 55 wt.-%, more preferably of between 30 and 50 wt.-%, in particular of between 35 and 45 wt.-%. The production of such a suspension is preferably carried out starting from a delipidated biomass and is disclosed in more detail in WO 2018/011275.

If an aqueous suspension of the delipidated Stramenopiles biomass, in particular delipidated Schizochytrid or Thraustochytrid biomass, is used, then the aqueous suspension preferably comprises lipids (crude fat) in an amount of 2 to 10 wt.-%, more preferably 3 to 8 wt.-%, in particular 4 to 6 wt.-%. Further, the lipid preferably comprises at least one PUFA selected from DHA and EPA, preferably in an amount of from 10 to 70 wt.-%, more preferably in an amount of 30 to 60 wt.-%. In a preferred embodiment of the invention, the lipid contains a mixture of DHA and EPA, wherein the ratio of DHA to EPA is preferably between 3:2 to 4:1 and wherein the amount of DHA is preferably from 30 to 50 wt.-% of the total amount of lipids contained and the amount of EPA is preferably from 10 to 20 wt.-%. of the total amount of lipids contained.

The aqueous suspension preferably further comprises crude protein in an amount of 8 to 18 wt.-%, more preferably 10 to 16 wt.-%, and/or crude ash in an amount of 8 to 14 wt.-%, more preferably in an amount of 9 to 13 wt.-%, and/or crude fiber in an amount of less than 1 wt.-%, more preferably less than 0.2 wt.-%, in particular in an amount of about 0 wt.-%.

The aqueous suspension can be converted into a dried biomass, for example by spray granulation of the biomass by means of fluidized bed granulation. Spray granulation by means of fluidized bed granulation is disclosed in more detail in EP13176661.0.

The intact cells of the delipidated biomass are preferably producers of polyunsaturated fatty acids (PUFAs). Preferred PUFAs are omega-3 fatty acids and omega-6 fatty acids, with omega-3 fatty acids being especially preferred. Very preferred omega-3 fatty acids are eicosapentaenoic acid (EPA, 20:5ω-3), in particular (5Z,8Z,11Z,14Z,17Z)-eicosa-5,8,11,14,17-pentaenoic acid, and docosahexaenoic acid (DHA, 22:6ω-3), in particular (4Z,7Z,10Z,13Z,16Z,19Z)-docosa-4,7,10,13,16,19-hexaenoic acid.

In a very preferred embodiment of the invention, cells, in particular a *Schizochytrium* strain, is employed for providing the delipidated biomass, which produces a significant amount of EPA and DHA, simultaneously, wherein DHA is preferably produced by the cells in an amount of at least 20 wt.-%, preferably in an amount of at least 30 wt.-%, in particular in an amount of 30 to 50 wt.-%, and EPA is produced in an amount of at least 5 wt.-%, preferably in an amount of at least 10 wt.-%, in particular in an amount of 10 to 20 wt.-% (in relation to the total amount of lipid as contained in the cells, respectively). Preferred species of microorganisms of the genus *Schizochytrium*, which produce EPA and DHA simultaneously in significant amounts, as mentioned before, are deposited under ATCC Accession No. PTA-10208, PTA-10209, PTA-10210, or PTA-10211, PTA-10212, PTA-10213, PTA-10214, PTA-10215.

The animal feed according to the invention can be used as feed for different kinds of animals, in particular for feeding poultry, swine, minks, ruminants, in particular beef cattle or calves, sheep, goats, companion animals or animals hold in aquaculture. In a very preferred embodiment of the invention, the animal feed is used for feeding beef cattle.

A further subject of the current invention is therefore a method of feeding animals, poultry, swine, minks, ruminants, in particular beef cattle or calves, sheep, goats, companion animals or animals hold in aquaculture, wherein the animals are fed with an animal feed according to the invention.

A very preferred subject matter of the current invention is a method for feeding beef cattle, wherein the beef cattle is fed with an animal feed according to the invention The method according to the invention is preferably carried out for improving the dry matter intake, average daily gain, gain/feed ratio, net energy for maintenance and/or net energy for growth of the animals and/or for increasing the content of PUFAs in the beef of the animals.

A further subject matter of the current invention is also a method for improving the dry matter intake, average daily gain, gain/feed ratio, net energy for maintenance and/or net energy for growth of the animals and/or for increasing the content of PUFAs in the beef of the animals, wherein the animals are fed with an animal feed which contains a biomass or biomass suspension according to the invention.

MATERIALS AND METHODS

The following experiment was conducted at the Eastern Nebraska Research and Extension Center (ENREC; near Mead, NE), University of Nebraska Animal Science Complex (Lincoln, NE) and the University of Nebraska Veterinary Diagnostic Center (UNL VDC; Lincoln, NE). Animal handling and space for the experiment were in accordance to the Guide for the Care and Use of Agricultural Animals in Agricultural Research and Teaching (FASS, 2010).

All procedures outlined as part of this study were approved by the University of Nebraska-Lincoln Institutional Animal Care and Use Committee (protocol number 1517). Because CARS is not currently approved by the FDA to be fed to cattle entering the human food chain, all cattle were incinerated at completion of the experiment, following intensive sampling of tissues.

CARS was produced as disclosed in example 1 of WO 2018/011275, by enzymatically lysing a Schizochytrid biomass and subsequent concentration of the lysed cell mixture. After demulsification of the lysed biomass, neutralization and separation of the crude oil, the remaining cell debris were resuspended in the aqueous phase as disclosed in example 1 of WO 2018/011275. The thus obtained aqueous phase was concentrated via evaporation to a dry matter content of about 40 wt.-%, resulting in CARS as used in the animal trials according to the current invention.

Experimental Design

A trial was conducted using forty crossbred cattle (20 steers and 20 heifers, 255 kg initial BW, SD=14). At receiving, all cattle were vaccinated with a *Mannheimia haemolytica*, bovine rhinotracheitis virus, bovine viral diarrhea (type 1 and 2), parainfluenza-3, and bovine respiratory syncytial virus combination vaccine (Bovi-shield One Shot, Zoetis, Florham Park, NJ), bacterin toxoid against seven clostridial diseases and *Haemophilus somnus* (Ultrabac-7, Zoetis), an intranasal vaccine containing bovine rhinotracheitis, parainfluenza-3, and bovine respiratory syncytial virus (Inforce 3, Zoetis), dewormed with 1% w/v doramectin (10 mg/mL, Dectomax, Zoetis), and received 10 mL of gamma-cyhalothrin pour-on (StandGuard, Elanco, Greenfield IN). Cattle were tagged with one 4-digit panel tag, a metal clip with the same four-digit identification, and electronic ID. All cattle were individually fed using the Calan gate system (American Calan Inc., Northwood, NH) within two pens separating steers and heifers. The calves underwent a 3-week training period to acclimate to the Calan gate system prior to trial initiation.

Each animal had approximately 46 linear cm of bunk space. Daily observations of each individual animal were recorded after feeding by trained animal care staff at the research facility; daily observation forms were kept on record.

Five days prior to the initiation of the trial, cattle were limit fed at 2% of BW on a common diet of 50% Sweet Bran (Cargill corn milling, Blair, NE) and 50% alfalfa hay (Watson et al., 2013). Cattle were weighed on 3 consecutive days prior to feeding to reduce error from gut fill, and the average was used as initial BW. Day 1 and 2 weights were averaged, and cattle were blocked by initial BW strata into 10 blocks where blocks 1, 3, 5, 7, and 9 represented the heaviest to lightest steers and blocks 2, 4, 6, 8, and 10 represented the heaviest to lightest heifers with each treatment being represented in each block. On the third day of weighing, cattle were additionally ear tagged with the corresponding bunk ID number.

Four dietary treatments were assigned randomly to animal within block. Diets consisted of increasing inclusion of CARS (0, 2.5, 5, and 7.5% of diet DM; Table 1) displacing dry rolled corn in the diet (70.0, 67.5, 65.0, and 62.5%). All diets contained 15% wet distillers grains, 10% grass hay, and 5% supplement (DM basis). Because of the high Na content of CARS (Table 2; 8.5% of DM), 2 supplements were formulated, one for the 0% CARS and another for the 7.5% CARS treatment. Both supplements were blended together for use in the 2.5% and 5% CARS diets. Supplements were formulated to limit dietary Na to 1% of diet DM. Supplements included limestone, urea, trace mineral premix, vitamin ADE premix, tallow, Rumensin (330 mg/animal daily; Elanco Animal Health), and Tylan (90 mg/animal daily; Elanco Animal Health) with fine ground corn as the carrier. Cattle were fed ad-libitum once daily (0700 h).

Feed refusals were collected weekly, weighed and then dried in a 60° C. forced air oven for 48 hours to calculate accurate DMI per individual. Approximately 400 g of each total mixed ration and individual ingredients (CARS, dry rolled corn, wet distillers grains, grass hay and supplement) were sampled weekly. Samples were composited into 3-week periods (6 composites of each of 4 diets and each ingredient) and subsequently analyzed for DM, OM, NDF, ADF, CP, macro- and micro-minerals (Ward Laboratories, Inc., Kearney, NE) and docosahexaenoic acid (DHA) and eicosapentaenoic acid (EPA; Eurofins Scientific, Des Moines, IA; Table 3). The DHA and EPA levels in diets were used to confirm dosage of CARS as CARS was the only source of DHA and EPA in the diets. Net energy calculations were calculated by the quadratic solution used by Vasconcelos and Galyean (2008).

Blood and Urine Analysis

Interim BW, urine, blood and Veterinary observations were obtained on days 0, 33, 61, 90 and harvest day.

On each collection day, cattle were processed through a chute, weighed, and visually appraised by a veterinarian for normal behavior and general health. Cattle were then dosed with furosemide (2 mL/45 kg BW, Lasix, Validus Pharmaceuticals LLC, Parsippany, NJ), a diuretic, to stimulate urination. A 50-mL conical tube was used to capture a urine sample.

Urine was chilled during collection and samples were immediately transported to the UNL VDC (Lincoln, NE) for urinalysis including protein, pH, ketone bodies, bilirubin, urobilinogen glucose (Chemstrip 2 GP, 2 LN, 9, 10 with SG, Roche Diagnostics, Indianapolis, IN) and microscopic examination. Samples of blood were collected by jugular venipuncture with 2 Vacuette Tube 6 mL K2E K2EDTA (Greiner Bio-One GmbH, Monroe, NC) and 2 Corvac Integrated Serum Separator Tubes (Covidien, Mansfield, MA) per animal. Blood samples were chilled following collection and immediately transported to the UNL Ruminant Nutrition laboratory (Lincoln, NE). At the laboratory, blood serum tube samples were placed in a 4° C. refrigerator for 1 hour before centrifugation at 1250×g for 10 min at 4° C. Blood and blood serum samples were sent to Iowa State University Veterinary Pathology Laboratory (Ames, IA) overnight for common hematology and blood chemistry. Hematology included white blood cell count (WBC), red blood cell count (RBC), mean corpuscular volume (MCV), mean corpuscular hemoglobin (MCH), mean corpuscular hemoglobin concentration (MCHC), red blood cell distribution width (RDW), mean platelet volume (MPV), platelet count, and neutrophil, lymphocyte, monocyte, eosinophil, basophil, plasma protein, fibrinogen, hematocrit and hemoglobin concentrations. Blood chemistry measures included Na, K, Cl, Ca, P, Mg, blood urea N (BUN), creatinine, glucose, total protein, albumin, alanine aminotransferase (ALT), aspartate aminotransferase (AST), alkaline phosphatase (ALP), gamma glutamyl transpeptidase (GGT), lactate dehydrogenase (LDH), creatine kinase, total bile acids, bicarbonate, and cholesterol.

Organ Harvest

Blocks were harvested at a target BW of 454 kg (419±22 kg), with blocks 1 and 2 on day 97, 3 and 4 on day 104, 5 and 6 on day 111, 7 and 8 on day 118, and 9 and 10 on day 125.

On each harvest day, all cattle were individually weighed at 0630 h at ENREC prior to feeding. The 8 cattle to be slaughtered that day had blood samples from the jugular vein taken while in the chute and were then held in a sort pen. Remaining cattle were also weighed and then returned to their pen. Veterinary observations were recorded on all animals. The 8 sorted animals were then transported to the University of Nebraska Animal Science complex (Lincoln, NE) where they were held in two 3.6×6 m pens (steers separate from heifers) and had access to water.

Cattle were trailered from the Animal Science complex to the UNL VDC in groups of 2 for harvest. Slaughter order was assigned randomly within block to avoid bias of timing of euthanasia. Steers were harvested before heifers. The cattle were injected with pentobarbital sodium (390 mg/mL, 1 mL/45 kg BW, Fatal-Plus, Vortech Pharmaceuticals, Dearborn, MI) to euthanize the animal and exsanguinated.

A pathologist, blinded to treatment, supervised the necropsy and recorded gross findings.

Feet were removed at the knee and the hock. The head was removed at the atlas and the hide was skinned away from the thoracic cavity. Urine collection was done post mortem by needle and syringe directly from the bladder. After evisceration, the rest of the hide was removed. Organs were isolated, removed, washed, weighed, and then sampled in duplicate (approximately 10 g per sample). Organs and tissues evaluated included: brain, spinal cord (2 segments), spleen, lung, pancreas, skeletal muscle, rumen reticulum, omasum, abomasum, duodenum, jejunum, cecum, colon, kidneys, urinary bladder, pituitary, thyroid, adrenal, liver, gall bladder, heart, mesenteric lymph node, skin, prostate, eye, bone and marrow, marrow smear, ileum, and thymus. For heifers, the ovaries, mammary gland, and uterus were also evaluated. After full tissue collection and necropsy, the cattle were incinerated at the UNL VDC.

Due to mechanical failures with the rail and hoist system on the first harvest day, block 2 heifers (4 animals) were held overnight at the University of Nebraska Animal Science complex.

The heifers were individually penned and allowed access to water and their assigned treatment diet (same amount as the previous day). Overnight the rail and hoist system was fixed, and the heifers were harvested the next day following the same procedures. The remaining harvest dates proceeded as planned with 8 animals harvested per day.

Preliminary Murine Experiments

Prior to the cattle feeding study, the safety of this novel feed ingredient was evaluated using a bacterial reverse mutation assay (Ames test) and an in vivo micronucleus test in mouse immature erythrocytes as well as repeated-dose toxicity studies rats. All studies were conducted by Eurofins Product Safety Laboratories (Dayton, NJ) in accordance with the GLP Regulations issued by the U.S. FDA (Title 21 of the CFR, Part 58; effective 1987) and followed the Organization for Economic Co-operation and Development (OECD) Guidelines for the Testing of Chemicals and Food Ingredients, Section 4, Parts 471, 474, and 408.

In the Ames test (Ames et al., 1973), CARS was investigated for its potential to induce gene mutations according to the plate incorporation test using *Salmonella typhimurium* strains TA 98, TA 100, TA 1535, TA 1537 and tester strain *Escherichia coli* WP2 uvrA. In two independent experiments several concentrations up to 5000 μg/plate of the test item were used.

Each experiment was conducted with and without metabolic activation. No toxic effects of the test item were noted in any of the five tester strains. No biologically relevant increases in revertant colony numbers were observed following treatment with CARS at any concentration level, neither in the presence nor absence of metabolic activation in both experiments indicating lack of mutagenic potential of CARS.

The safety of CARS was also evaluated in a 14-day dietary toxicity study in rats followed by a sub chronic 90-day dietary study in Sprague-Dawley rats. In the 90-day study (OECD Test Guideline 474), the test material was added to the basal diet at dietary levels of 0.5% (5000 ppm), 1.5% (15,000 ppm) and 5.0% (50,000 ppm). Each experimental group consisted of 10 animals per sex. The stability, homogeneity and concentration of CARS in the diet were confirmed by analysis based on Docosahexaenoic Acid (DHA) content in the diet (Eurofins Central Analytical Laboratories, Metairie, LA). There were no changes in BW, BW gain, feed consumption or feed efficiency in male and female rats attributable to the administration of test substance. There were no test substance-related changes in hematology, coagulation, clinical chemistry and urinalysis parameters. There were no CARS-related macroscopic or organ weight changes. Test substance related microscopic findings consisted of pancreatic acinar cell hyperplasia observed in High Dose (50,000 ppm) males (found in 3 out of 10 animals).

Therefore, under the conditions of the study and based on the toxicological endpoints evaluated, the No-Adverse-Effect Level for administration of CARS in the rodent diet was determined to be 1.5% of the diet (15,000 ppm), equivalent to an overall average CARS intake of 1071 mg/kg BW daily for male and female rats. These preliminary experiments were completed prior to the current cattle feeding trial and suggested no toxic effects of CARS.

Statistical Analyses

Performance data (BW, ADG, DMI, G:F, HCW, NEm, NEg, and organ weights) were analyzed using the mixed procedure of SAS (SAS Inc., Cary, NC) as a randomized complete block design with treatment, gender, and treatment by gender interactions as fixed effects, BW block as a random effect and individual animal as the experimental unit. Interactions were removed from the model if not significant. Orthogonal contrasts were used to test significance for linear, quadratic and cubic responses due to CARS inclusion. Blood and urine data were analyzed as repeated measures with an optimized covariate structure selected based on the lowest Akaike information criterion score suggesting the best model fit (Littell et al., 1998). For a few variables measured in the urine (epithelial cells, amorphous crystals, triple phosphate crystals, WBC, blood, protein, anisocytosis, acanthocyte, and echinocyte) qualitative data were collected and then transposed to numerals for analysis (0=none, 1=few, 2=moderate, 3=many).

Probabilities less than or equal to 0.05 were considered significant, less than or equal to 0.10 were declared tendencies.

RESULTS AND DISCUSSION

Cattle Performance

There were no interactions between sex and treatment ($P\geq0.25$) for performance data. Sex was significant for all variables ($P\leq0.04$) with steers having greater DMI, initial BW, ADG, HCW and final BW, compared to heifers. There were no differences in initial BW between CARS treatments ($P\geq0.27$). There was a quadratic response ($P=0.01$; Table 4) observed for DMI with cattle fed 2.5% CARS having the greatest DMI of 8.98 kg/d. There was a quadratic ($P<0.01$) response for ADG with cattle fed 2.5% and 5% CARS having the greatest numerical values of 1.40 and 1.37 kg, respectively. Live final BW responded quadratically ($P<0.01$) and was the greatest for cattle fed 2.5% and 5% CARS, 428 and 427 kg, respectively. The cattle fed 7.5% CARS had the lowest DMI and ADG ($P\leq0.01$); however, this treatment elicited a greater G:F of 0.186, linearly ($P<0.01$) increasing with increased algae inclusion in the diet. Both NEm and NEg linearly increased ($P<0.01$) with increasing inclusion of CARS. Cattle fed diets containing 2.5, 5, or 7.5% CARS had 4.2, 11.4, and 12.0% improvements in G:F relative to the corn control diet.

The CARS evaluated in this trial differs from other algal based feedstuffs fed to cattle and evaluated in previous research (Franklin et al., 1999; Drewery et al., 2014; Van Emon et al., 2015; Costa et al., 2016; Stokes et al., 2016). The nutrient profile is unique due to both the initial algae feedstock and the processing methods of CARS production. Much of the previous research has also fed the algal residue in combination with other feeds, such as soyhulls (Van Emon et al., 2015; Stokes et al., 2016) or to growing cattle (Drewery et al., 2014; Van Emon et al., 2015; Costa et al., 2016). In a trial with finishing cattle, a meal consisting of 43% partially deoiled microalgal residue and 57% soyhulls replaced up to 42% of the dietary dry rolled corn (Stokes et al., 2016). Authors reported no differences in final BW or ADG, but a linear decrease in G:F as the algal meal replaced corn in the diet. This resulted in a linear decrease in both dietary ME and NEg as algal meal inclusion increased. Results from the current trial suggest feeding algal residue up to 7.5% of dietary DM linearly increased G:F and dietary NEg. This would be a similar algae inclusion as the lowest inclusion of algae meal (14% diet DM) in the Stokes et al. (2016) trial. Algal residues are somewhat variable depending on the species grown and the manufacturing process used for production. The CARS product evaluated in the current trial appears to be a suitable replacement for corn in finishing diets, up to 7.5% of diet DM, and improved ADG and G:F up to 5% inclusion of the diet DM.

Organ Weights

Organ weights were analyzed as absolute organ weight as well as organ weight as a percent of shrunk BW (SBW, final BW shrunk 4% to account for gut fill).

There were no significant differences ($P\geq0.16$) among treatments for organ weight of spleen, lungs, rumen, reticulum, omasum, ileum, cecum, kidneys, pituitary, adrenal, eye, thymus, uterus, ovaries, prostate, and seminal vesicle.

Pancreas weight linearly increased ($P=0.02$) as CARS inclusion increased in the diet; however, this could be attributed to the difficulty of distinguishing pancreas and fat connected to the pancreas. There was a quadratic response observed for brain weight ($P=0.04$); cattle fed 5% CARS had the greatest brain weight of 387 g, which was not different from cattle fed 0 and 2.5% CARS ($P\geq0.10$) but was greater than cattle fed 7.5% CARS at 356 g ($P=0.01$). Liver weight linearly increased ($P<0.01$) as CARS inclusion increased in the diet. Thyroid weight had a quadratic response ($P=0.02$), with cattle fed 2.5% CARS having the greatest weight of 31.8 g, statistically different from cattle fed 0% CARS ($P<0.01$), but not different from cattle fed 5% and 7.5% CARS ($P\geq0.11$). There was a quadratic ($P=0.04$) response for abomasum weight with cattle fed 0% CARS having the lightest weight of 1.25 kg and cattle fed 5% CARS having the greatest weight of 1.41 kg. Similarly, there was a quadratic response ($P=0.03$) for duodenum weight with cattle fed 0% CARS having the lightest weight of 273 g and cattle fed 5% CARS having the greatest weight of 326 g. The difference in duodenum weight between treatments could be attributed to variation in discretion of where the duodenum ends and the jejunum begins. There was a cubic response observed for urinary bladder weight with cattle fed 2.5% CARS having the greatest weight of 116 g, and cattle fed 5% CARS having the smallest weight of 96.4 g. Differences in urinary bladder weight were small, and the cubic response suggests differences were due to variation and error in measurement, not biological differences due to treatment.

There was a tendency for a sex×treatment interaction ($P=0.08$) for jejunum weight with steers fed 7.5% CARS having the greatest weight of 6.33 kg and heifers fed 5% CARS having the greatest weight of 5.69 kg. There was a sex×treatment interaction ($P=0.02$) for gall bladder weight, with a quadratic ($P<0.01$) response. Steers fed 2.5% CARS had the greatest weight of 81.6 g while heifers fed 5% CARS had the greatest weight of 107 g. The heart also had a sex×treatment interaction ($P=0.04$) with steers fed 7.5% CARS having the greatest heart weight (2.21 kg) and heifers on the 5% CARS treatment having the greatest heart weight (2.07 kg). The colon also had a sex×treatment interaction ($P=0.02$) with steers fed 7.5% CARS having the greatest colon weight (4.38 kg) and heifers fed 2.5% CARS having the greatest colon weight (4.93 kg).

Organ Weight as % of SBW

There were no significant differences ($P\geq0.07$) among treatments in organ weight as a % of SBW for spleen, lungs, rumen, reticulum, omasum, abomasum, duodenum, ileum, cecum, kidneys, urinary bladder, brain, pituitary, adrenal, thymus, prostate, seminal vesicles, uterus, ovaries, and colon. A difference in liver weight as % of SBW was observed, with a quadradic response ($P<0.01$); cattle fed 7.5% CARS had the greatest weight (2.05 kg). The thyroid also had a quadratic response ($P=0.04$), but differences due to treatment were small, varying from 0.006 to 0.008% of SBW. The weight of both the pancreas and eye linearly ($P\leq0.01$) increased as CARS inclusion increased in the diet.

The jejunum had a sex×treatment interaction ($P=0.04$), and linearly ($P<0.01$) increased as CARS increased in the diet. There was a sex×treatment interaction ($P=0.04$) in colon weight with steers fed 2.5% and 5% CARS having the smallest colon and an increase in colon weight for heifers fed 2.5% and 5% CARS (P≤0.04). There was a tendency (P=0.07) for colon weight as a % of SBW to be greater in heifers than steers. There was a sex×treatment interaction (P=0.01) in gall bladder weight as a % of SBW, with steers fed 2.5% CARS having the greatest gall bladder weight and heifers fed 5% CARS having the greatest gall bladder weight. There was a sex×treatment interaction (P=0.03) for heart weight as a % of SBW.

Heart weight linearly increased (P=0.01) from 0.444% to 0.554% of SBW in steers and from 0.454% to 0.515% in heifers as inclusion of CARS increased in the diet.

Absolute organ weights and organ weights as a % of SBW are similar to values published in the literature (Hersom et al., 2004; McCurdy et al., 2010). Differences due to CARS inclusion were relatively minor and likely due to nutrient load. Differences in liver, pancreas, and gall bladder weights between treatments were the most pronounced. These organs function in nutrient digestion and excess nutrient excretion. With increasing inclusion of CARS, some minerals, primarily Na, were increased in the diet and would have been processed by the liver.

Hematology

Both hemoglobin and hematocrit concentrations quadratically decreased (P=0.05) with increasing inclusion of CARS. For both measures, minimum concentrations were observed for cattle fed 2.5% CARS. Red blood cell distribution width (RDW) linearly increased (P=0.02) from 20.9 to 22.0% with increasing inclusion of CARS. There was a linear tendency (P=0.09) for monocyte concentrations to increase as CARS inclusion in the diet increased, but all treatments fell within the expected laboratory reference range. There was no difference due to sex (P=0.80) and no treatment×sex interaction (P=0.48) for monocyte concentrations.

Sex was not significant (P≥0.16), and there were no treatment×sex interactions (P≥0.42) for WBC, RBC, hemoglobin, hematocrit, MCHC, RDW, platelet count, MPV, and lymphocyte, eosinophil, basophil, and fibrinogen concentrations (data not shown). Sex was significant (P=0.02) for MCV, with heifers having an average volume of 40.8 fl, and steers having an average volume of 38.6 fl, but no treatment×sex interaction (P=0.38) was observed.

Sex was significant (P=0.02) for neutrophil concentrations, with heifers having greater concentration of neutrophils at $3.57 \times 10^3$/ul and steers having a concentration at $2.84 \times 10^3$/ul, but there were no differences between treatments (P=0.18). There was a difference due to sex (P=0.02) in the concentration of plasma protein with heifers having a concentration of 8.36 g/dL and steers having a concentration of 8.09 g/dL, and there was tendency for a treatment×sex interaction (P=0.08), but no differences among treatments (P=0.11).

Laboratory reference intervals of hematology variables measured in cattle are in expected ranges (Veterinary Pathology, 2011). Nearly all variables were well within the prescribed expected range. The RDW was greater than expected, averaging 21.4% for all treatments with 8.0 to 15% considered the expected range. Fibrinogen concentrations were slightly elevated above the laboratory reference range for cattle fed 0% and 2.5% CARS at 516 and 582 mg/dL, respectively. The maximum upper limit of the laboratory reference range is 500 mg/dL. The MCV value for cattle fed 2.5% CARS was slightly lower than expected at 38.9 fl with the lower end of the expected range at 40.0 fl. The MPV of cattle fed 7.5% CARS was greater than expected at 8.27 fl and the upper end of the expected range at 8.0 fl. Plasma protein concentrations of all treatments were greater than expected, averaging 8.22 g/dL and the upper end of the expected range at 7.7 g/dL. These expected ranges may have been established using different animal populations that may not be representative of normal feedlot animals on a finishing diet. Daily cattle observations and visual health observations all suggested cattle were healthy and showed no adverse effects to any dietary treatment.

Blood Chemistry

There were no differences due to sex (P≥0.11), no treatment×sex interactions (P≥0.29) and no differences among treatments (P≥0.10) observed for blood Na, blood K, blood P, blood Ca, BUN, blood glucose, total bile acids, and AST concentrations. There was a tendency for a linear decrease (P=0.06) in ALT concentration as CARS inclusion increased.

There were no treatment×sex interactions (P=0.46) and no differences due to sex (P=0.47) for ALT concentration. There was a linear decrease (P≤0.01) in blood Cl concentration as CARS increased in the diet and a difference due to sex (P≤0.01), with heifers having a concentration of 101 mEq/L and steers having a concentration of 100 mEq/L. There were no treatment×sex interactions (P=0.45) for Cl concentration and blood Cl concentrations were within the expected ranges for cattle. There was a linear increase (P<0.01) in blood bicarbonate concentration as CARS increased in the diet and a difference due to sex (P=0.03), with heifers having a lower concentration than steers, 27.7 and 28.5 mEq/L respectively. There were no treatment×sex interactions (P=0.55) for blood bicarbonate concentration and measured values were within the expected ranges for cattle. There was a cubic response (P=0.03) for blood Mg with cattle fed 5% CARS having the highest blood Mg concentration of 2.07 mg/dL. There was no difference due to sex (P=0.11), and no treatment×sex interaction (P=0.50) for blood Mg concentration. Stokes et al. (2016) reported no differences due to algal meal inclusion in the diet on plasma Mg levels; values they reported are similar to the current trial averaging 2.36 mg/dL.

There was a tendency for a cubic response (P=0.09) for blood albumin concentrations with cattle fed 5% CARS having the greatest concentrations of 3.27 g/dL; all treatments were within the expected range for cattle. Blood creatinine concentration linearly increased (P<0.01) from 1.07 to 1.16 mg/dL as CARS inclusion increased in the diet. There was a tendency for a treatment×sex interaction (P=0.09) in total protein concentration; however, there were no differences among treatments (P≥0.10) and measured values were within the expected range for cattle. Sex was not significant (P=0.50), for blood creatine kinase concentrations; however, there was a tendency for a treatment×sex interaction (P=0.10), and a quadratic decrease (P=0.02) was observed with cattle fed 7.5% CARS having the greatest concentration of 217 IU/L.

The creatine kinase concentration for all treatments was within the expected range for cattle.

Alkaline phosphatase concentrations decreased linearly (P<0.01) from 65.4 to 43.7 IU/L as CARS inclusion increased in the diet, but were within the expected range for cattle. There was a tendency for a difference due to sex (P=0.08) for GGT, and a quadratic (P<0.01) response was observed with cattle fed 0 and 7.5% CARS having the greatest concentrations of 46.8 and 45.1 IU/L respectively.

Total bilirubin concentration had a cubic response (P<0.01) with cattle fed 5% CARS having the greatest concentration at 0.366 mg/dL. Sex was significant (P=0.04) for total bilirubin with heifers having a greater concentration at 0.351 mg/dL and steers at 0.323 mg/dL. All treatments had higher concentrations than would be expected for cattle, with the upper limit being 0.18 mg/dL. There was a tendency (P=0.08) for steers and heifers to be different in total bile acids; steers had a concentration of 38.8 umol/L and heifers 29.4 umol/L, but no differences among treatments (P≥0.10). There was a tendency for a treatment×sex interaction (P=0.09) in cholesterol, but no differences due to sex (P=0.70). Cholesterol had a tendency to linearly increase (P=0.07) as CARS inclusion in the diet increased. There was a difference due to sex (P=0.02) for LDH levels; heifers had LDH levels of 4390 IU/L and steers had levels of 4120 IU/L. There was a quadratic (P=0.04) response observed for LDH with cattle fed 7.5% CARS having the greatest concentration of LDH at 4494 IU/L, which is above the upper limit of the expected range, 410 IU/L. Feedlot cattle have a large metabolic activity due to the high energy diets they are fed. This can lead to greater hepatocellular swelling and leakage, which is a primary source of LDH. Also, younger animals generally have greater levels of LDH.

The expected range was developed from a mix of cattle, likely cows on forage based diets as cattle on all treatments had elevated LDH concentrations relative to the expected range.

Laboratory reference intervals for blood chemistry variables measured in cattle are in expected ranges. Nearly all variables were well within the prescribed expected range. However, these expected ranges may have been established using different animal populations that may not be representative of normal feedlot animals on a finishing diet. Total bilirubin was greater than expected, averaging 0.338 mg/dL while the upper end of the expected range is 0.18 mg/dL. Blood concentrations of Ca and P were also greater than expected, averaging 10.3 and 8.17 mg/dL, while upper expected limits are 10.1 and 7.9 mg/dL. Blood Mg concentration averaged 2.00 mg/dL, less than the expected value of 2.10 mg/dL. Daily cattle observations and visual health observations all suggested cattle were healthy and showed no adverse effects of any treatment.

Urine Analysis

Sex did not impact pH (P=0.45) or specific gravity (P=0.95) of urine. Urine pH did not have a treatment×sex interaction (P=0.21) but there was a quadratic response (P<0.01) as CARS increased in the diet with cattle fed 5% CARS having the greatest pH (8.70).

There were no differences among treatments (P≥0.96) for specific gravity.

There were no differences among treatments and no treatment×sex interactions (P≥0.17) for epithelial cells, amorphous crystals, WBC, protein or blood measured in the urinalysis. Epithelial cell count was quantified as few (1-10 cells/field) in all treatments. Amorphous crystals, WBC, protein and blood were all quantified as none for all treatments. Triple phosphate crystals had a numerical difference of none for cattle fed 0% CARS and few (1-10 crystals/field) for cattle fed 2.5, 5, or 7.5% CARS, but no statistical difference between treatments (P=0.10).

Histopathology

Two treatments (cattle fed 0% CARS and 7.5% CARS) were compared for all histopathology analysis. The pathologist was blinded to treatments and slides from tissues of cattle fed 0 and 7.5% CARS were evaluated as either 0=normal, or 1=abnormal. There were no significant differences due to treatment (P≥0.24) for: brain (5 slides evaluated), spinal cord (2), eye, spleen, left cranial lung, right caudal lung, pancreas, longissimus (skeletal muscle), brisket (skeletal muscle), rumen (3), reticulum, omasum, abomasum, duodenum, jejunum (3), cecum, ileum, thymus, colon (2), right kidney, left kidney, urinary bladder, pituitary, thyroid, adrenal, left liver, right liver, gall bladder, left side of heart, right side of heart, mesenteric lymph node (2), prostate, ovary (2), skin, hoof c band, hoof wall, hoof sole, and bone marrow. It was assumed that with no differences between the 2 extreme inclusions of CARS (0 vs 7.5%), the intermediate treatments were also not affected. Histology results from 0 and 7.5% CARS suggest that there were no differences in tissue health of the cattle whether CARS was included in the diet or not.

IMPLICATIONS

The feedstuff CARS demonstrated to be a safe and efficacious feed ingredient in cattle diets. Feeding CARS to finishing cattle improved G:F as inclusion in the diet increased up to 7.5% of diet DM. Cattle HCW, ADG, and DMI all increased quadratically and were maximized when cattle were fed 2.5 or 5% CARS. No adverse effects of feeding CARS were observed in hematology, blood chemistry, or histopathology analyses. An increase in organ weight was observed for the liver, thyroid, gall bladder, pancreas, jejunum, and heart when CARS was fed, but no impact on health was observed and no differences in tissues were found. Further research is needed to determine the optimal inclusion of CARS on performance and carcass traits when fed an entire feeding period, as well as potential for CARS to be used in growing cattle diets.

LITERATURE CITED

Ames, B. N., W. E. Durston, E. Yamasaki, F. D. Lee. 1973. Carcinogens are mutagens: a simple test system combining liver homogenates for activation and bacteria for detection. Proc. Natl. Acad. Sci. U.S.A. 70:2281-2285.

Bryant, H. L., L. Gogichaishvili, D. Anderson, J. W. Richardson, J. Sawyer, T. Wickersham, M. L. Drewery. 2012. The value of post-extracted algae residue. Algal Research 1:185-193.

Costa, D. F. A., S. P. Quigley, P. Isherwood, S. R. McLennan, D. P. Poppi. 2016. Supplemenation of cattle fed tropical grasses with microalgae increases microbial protein production and average daily gain. J. Anim. Sci. 94:2047-2058.

Drewery, M. L., J. E. Sawyer, W. E. Pinchak, T. A. Wickersham. 2014. Effect of increasing amounts of post extraction algal residue on straw utilization in steers. J. Anim. Sci. 92:4642-4649.

FASS, 2010. Guide for the Care and Use of Agricultural Animals in Agricultural Research and Teaching. 3$^{rd}$ rev. ed. FASS Inc., Champaign, IL Franklin, S. T., K. R. Martin, R. J. Baer, D. J. Schingoethe, A. R. Hippen. 1999. Dietary marine algae (*Schizochytrium* sp.) increases concentrations of conjugated linoleic, docosahexaenoic and transvaccenic acids in milk of dairy cows. J. Nutr. 129:2048-2052.

Hersom, M. J., C. R. Krehbiel, G. W. Horn. 2004. Effect of live weight gain of steers during winter grazing: II.

Visceral organ mass, cellularity, and oxygen consumption. J. Anim. Sci. 82:184-197.

Littell, R. C., P. R. Henry, C. B. Ammerman. 1998. Statistical analysis of repeated measures data using SAS procedures. J. Anim. Sci. 76:1216-1231.

Lum, K. K., J. Kim, X. G. Lei. 2013. Dual potential of microalgae as a sustainable biofuel feedstock and animal feed. J. Anim. Sci. and Biotechnology 4:53-60.

McCurdy, M. P., C. R. Krehbiel, G. W. Horn, P. A. Lancaster, J. J. Wagner. 2010. Effects of winter growing program on visceral organ mass, composition, and oxygen consumption of beef steers during growing and finishing. J. Anim. Sci. 88:1554-1563.

Ogbonna, J. C., H. Masui, H. Tanaka. 1997. Sequential heterotrophic/autotrophic cultivation—An efficient method of producing *Chlorella* biomass for health food and animal feed. J. Applied Phycology 9: 359-366.

Stokes, R. S., D. D. Loy, S. L. Hansen. 2016. Effects of increased inclusion of algae meal on finishing performance and carcass characteristics. J. Anim. Sci. 94:687-696.

Van Emon, M. L., D. D. Loy, S. L. Hansen. 2015. Determining the preference, in vitro digestibility, in situ disappearance, and grower period performance of steers fed a novel algae meal derived from heterotrophic microalgae. J. Anim. Sci. 93:3121-3129.

Vasconcelos, J. T, M. L. Galyean. 2008. Technical Note: Do dietary net energy values calculated from performance data offer increased sensitivity for detecting treatment differences? J. Anim. Sci. 86:2756-2760.

Veterinary Pathology. 2011. Reference intervals from Clinical Pathology Laboratory. Department of Veterinary Pathology, College of Veterinary Medicine, IA State https://www.vetmed.iastate.edu/vpath/services/diaanostic-services/clinical-pathology/testing-and-fees/reference-intervals.

Watson, A. K., B. L. Nuttelman, T. J. Klopfenstein, L. W. Lomas, G. E. Erickson. 2013. Impacts of a limit-feeding procedure on variation and accuracy of cattle weights. J. Anim. Sci. 91:5507-5517.

TABLE 1

Composition of diets containing increasing inclusions of Condensed Algal Residue Solubles (CARS) and individually fed to steers and heifers

| Ingredient, % diet DM | Treatment | | | |
|---|---|---|---|---|
| | 0% | 2.5% | 5% | 7.5% |
| Dry rolled corn | 70.0 | 67.5 | 65.0 | 62.5 |
| Wet distillers grains | 15.0 | 15.0 | 15.0 | 15.0 |
| Grass hay | 10.0 | 10.0 | 10.0 | 10.0 |
| CARS | — | 2.5 | 5.0 | 7.5 |
| Supplement | 5.0 | 5.0 | 5.0 | 5.0 |
| Fine ground corn | 2.28 | 2.49 | 2.70 | 3.12 |
| Limestone | 1.69 | 1.69 | 1.69 | 1.69 |
| Tallow | 0.125 | 0.125 | 0.125 | 0.125 |
| Urea | 0.54 | 0.405 | 0.27 | — |
| Salt | 0.30 | 0.225 | 0.15 | — |
| Trace mineral premix | 0.05 | 0.05 | 0.05 | 0.05 |
| Vitamin A-D-E premix | 0.015 | 0.015 | 0.015 | 0.015 |

TABLE 2

Nutrient composition of Condensed Algal Residue Solubles (CARS)

| Item | CARS |
|---|---|
| DM, % | 41.7 |
| %, DM basis | |
| CP | 29.3 |
| NDF | 34.6 |
| ADF | 2.3 |
| Ca | 0.16 |
| P | 0.82 |
| K | 1.51 |
| S | 2.54 |
| Na | 8.52 |
| mg/kg, DM basis | |
| Mg | 0.33 |
| Zn | 43.87 |
| Fe | 86.33 |
| Mn | 13.5 |
| Cu | 6.00 |
| Mo | 0.69 |

TABLE 3

Dry matter composition of diets containing increasing inclusions of Condensed Algal Residue Solubles (CARS) with overall ±SD

| Nutrient analysis, %[2] | Treatment[1] | | | |
|---|---|---|---|---|
| | 0 | 2.5 | 5 | 7.5 |
| DM | 69.0 ± 3.04 | 67.1 ± 1.42 | 66.0 ± 1.69 | 64.6 ± 1.45 |
| OM | 65.1 ± 0.491 | 61.8 ± 0.854 | 60.3 ± 0.428 | 58.4 ± 0.440 |
| CP | 13.3 ± 0.705 | 14.4 ± 1.02 | 14.2 ± 0.339 | 14.1 ± 0.534 |
| NDF | 15.2 ± 0.686 | 14.0 ± 2.39 | 16.6 ± 3.35 | 17.5 ± 2.78 |
| ADF | 6.9 ± 1.05 | 6.6 ± 0.769 | 8.5 ± 2.35 | 9.4 ± 1.97 |
| Ca | 0.550 ± 0.149 | 0.875 ± 0.265 | 0.815 ± 0.241 | 0.687 ± 0.105 |
| P | 0.377 ± 0.032 | 0.403 ± 0.045 | 0.408 ± 0.053 | 0.430 ± 0.045 |
| K | 0.635 ± 0.049 | 0.678 ± 0.061 | 0.713 ± 0.079 | 0.723 ± 0.067 |
| S | 0.200 ± 0.013 | 0.280 ± 0.024 | 0.348 ± 0.046 | 0.415 ± 0.027 |
| Na | 0.153 ± 0.023 | 0.385 ± 0.053 | 0.593 ± 0.067 | 0.778 ± 0.087 |
| Mg | 0.147 ± 0.019 | 0.163 ± 0.021 | 0.165 ± 0.020 | 0.168 ± 0.022 |
| Zn, mg/kg | 50.6 ± 7.04 | 59.7 ± 10.1 | 58.7 ± 2.84 | 56.1 ± 6.08 |
| Fe, mg/kg | 162.5 ± 32.6 | 191.5 ± 35.0 | 185.5 ± 12.9 | 201.0 ± 47.0 |
| Mn, mg/kg | 32.8 ± 4.26 | 38.3 ± 5.32 | 38.5 ± 2.74 | 36.3 ± 2.73 |
| Cu, mg/kg | 13.9 ± 1.44 | 17.6 ± 7.94 | 17.3 ± 2.90 | 14.8 ± 1.06 |
| Mo, mg/kg | 0.678 ± 0.093 | 0.842 ± 0.141 | 0.863 ± 0.104 | 0.825 ± 0.115 |

TABLE 3-continued

Dry matter composition of diets containing increasing inclusions of Condensed Algal Residue Solubles (CARS) with overall ±SD

| Nutrient analysis. %[2] | Treatment[1] | | | |
|---|---|---|---|---|
| | 0 | 2.5 | 5 | 7.5 |
| DHA[3] | <0.02 | 0.148 ± 0.023 | 0.300 ± 0.038 | 0.475 ± 0.061 |
| EPA[3] | <0.02 | 0.038 ± 0.008 | 0.077 ± 0.008 | 0.113 ± 0.015 |

[1]Differences in dietary treatments were due to CARS inclusion (0, 2.5, 5, or 7.5% of diet DM).
[2]Nutrient analysis was measured on weekly grab samples of total mixed diets, composited into six, 3 week period samples and analyzed by Ward Laboratories, Inc., Kearney, NE.
[3]DHA = docosahexaenoic acid; EPA = eicosapentaenoic acid; measured by Eurofins Scientific, Des Moines, IA

TABLE 4

Performance of steers and heifers individually fed Condensed Algal Residue Solubles (CARS) at increasing inclusions

| Item | Treatment[1] | | | | SEM | Contrast | | |
|---|---|---|---|---|---|---|---|---|
| | 0 | 2.5 | 5 | 7.5 | | Linear | Quadratic | Cubic |
| Initial BW, kg | 255 | 255 | 258 | 254 | 1.85 | 0.94 | 0.27 | 0.33 |
| Final BW, kg | 417$^{ab}$ | 428$^a$ | 427$^a$ | 404$^b$ | 5.28 | 0.10 | <0.01 | 0.71 |
| HCW, kg | 238$^a$ | 243$^a$ | 244$^a$ | 226$^b$ | 3.97 | 0.05 | 0.01 | 0.50 |
| DMI, kg/d | 8.80$^a$ | 8.98$^a$ | 8.21$^b$ | 7.35$^c$ | 0.204 | <0.01 | 0.01 | 0.32 |
| ADG, kg | 1.31$^{ab}$ | 1.40$^a$ | 1.37$^a$ | 1.21$^b$ | 0.040 | 0.07 | <0.01 | 0.97 |
| G:F | 0.166$^a$ | 0.173$^a$ | 0.185$^b$ | 0.186$^b$ | 0.0035 | <0.01 | 0.36 | 0.30 |
| NE$_m$ | 1.82$^a$ | 1.86$^a$ | 1.98$^b$ | 2.03$^b$ | 0.027 | <0.01 | 0.78 | 0.21 |
| NE$_g$ | 1.19$^a$ | 1.22$^a$ | 1.33$^b$ | 1.37$^b$ | 0.024 | <0.01 | 0.78 | 0.21 |

[1]Differences in dietary treatments were due to CARS inclusion (0, 2.5, 5, or 7.5% of diet DM).
$^{abc}$Within a row, means a without a common superscript differ (P < 0.05)

The invention claimed is:

1. An animal feed, comprising:
   a) 50 to 80 wt.-% dry matter of cereal grains;
   b) 0.1 to 15 wt.-% dry matter of a Thraustochytrid biomass, wherein lipids are present in an amount of 3-14 wt.-% and the lipids comprise at least one PUFA selected from docosahexaenoic acid (DHA) and eicosapentaenoic acid (EPA) in an amount of from 10 to 70 wt.-%;
   and at least one further component, selected from:
   c) by-products from distillers/ethanol industry in an amount of up to 40 wt.-% dry matter;
   d) forage in an amount of up to 20 wt.-% dry matter;
   e) protein meal in an amount of up to 20 wt.-% dry matter;
   f) a further fat source in an amount of up to 4 wt.-% dry matter;
   g) a further liquid by-product in an amount of up to 10 wt.-% dry matter.

2. The animal feed of claim 1, wherein, in paragraph b), said Thraustochytrid biomass is *Schizochytrium* biomass present in said animal feed at 0.6-10 wt.-% dry matter and wherein lipids are present in an amount of 5-10 wt.-%.

3. The animal feed of claim 2, wherein, in paragraph b), said Thraustochytrid biomass is *Schizochytrium* biomass present in said animal feed at 1-6 wt.-% dry matter, and wherein DHA and EPA are present at a ratio of 3:2 to 4:1.

4. The animal feed of claim 1, wherein, in paragraph b), said Thraustochytrid biomass is *Schizochytrium* biomass present in said animal feed at 2.5-7.5 wt.-% dry matter and wherein DHA is present at from 30 to 50 wt.-% of the total amount of lipids and the amount of EPA is present at from 10 to 20 wt.-%. of the total amount of lipids.

5. The method of claim 4, wherein the animal feed comprises by-products from distillers/ethanol industry in an amount of 5 to 30 wt.-% dry matter, and wherein the by-products are selected from the group consisting of: distillers corn; distillers barley; distillers sorghum; distillers wheat; and mixtures thereof.

6. The animal feed of claim 1, wherein the animal feed comprises forage in an amount of 0.1 to 20 wt.-% dry matter.

7. The animal feed of claim 6, wherein the animal feed comprises forage in an amount of 5 to 15 wt.-% dry matter, and wherein the forage is selected from the group consisting of: grass; hay; alfalfa hay; grass silage; corn silage; rye silage; and mixtures thereof.

8. The animal feed of claim 1, wherein the animal feed comprises protein meal in an amount of 0.5 to 20 wt.-% dry matter.

9. The animal feed of claim 8, wherein the animal feed comprises protein meal in an amount of 2 to 20 wt.-% dry matter, and wherein the protein meal is selected from the group consisting of: canola meal; soybean meal; and mixtures thereof.

10. The animal feed of claim 1, wherein the animal feed comprises a further fat source in an amount of 0.5 to 4 wt.-% dry matter.

11. The animal feed of claim 1, wherein the animal feed comprises a further fat source in an amount of 1 to 4 wt.-% dry matter, and wherein the further fat source is selected from the group consisting of: grease; poultry fat; vegetable oils; and mixtures thereof.

12. The animal feed of claim 1, wherein the animal feed comprises a further liquid by-product in an amount of 0.5 to 10 wt.-% dry matter.

13. The animal feed of claim 12, wherein the animal feed comprises a further liquid by-product in an amount of 1 to 10 wt.-% dry matter, and wherein the further liquid by-product is selected from the group consisting of: molasses products; corn steep liquids; glycerol; and mixtures thereof.

14. The animal feed of claim 1, further comprising mineral and vitamin supplements.

15. The animal feed of claim 1, further comprising crude protein in an amount of more than 20 wt.-%, and/or neutral detergent fibers (NDF) in an amount of more than 25 wt.-%.

16. The animal feed of claim 1, wherein the Thraustochytrid biomass comprises polyunsaturated fatty acids.

17. The animal feed of claim 16, wherein the Thraustochytrid biomass is a delipidated biomass or an aqueous suspension thereof.

18. A method of feeding animals, comprising providing said animals with the animal feed of claim 1.

19. A method for improving dry matter intake, average daily gain, gain/feed ratio, net energy for maintenance and/or net energy for growth of the animals and/or for increasing the content of PUFAs in the meat of the animals, wherein the animals are fed the animal feed of claim 1.

* * * * *